(12) United States Patent
Tojo et al.

(10) Patent No.: US 9,092,868 B2
(45) Date of Patent: Jul. 28, 2015

(54) APPARATUS FOR DETECTING OBJECT FROM IMAGE AND METHOD THEREFOR

(75) Inventors: Hiroshi Tojo, Fuchu (JP); Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 538 days.

(21) Appl. No.: 13/462,621

(22) Filed: May 2, 2012

(65) Prior Publication Data

US 2012/0288153 A1 Nov. 15, 2012

(30) Foreign Application Priority Data

May 9, 2011 (JP) .................................. 2011-104517

(51) Int. Cl.
*G06K 9/00* (2006.01)
*G06T 7/00* (2006.01)
*G06T 7/20* (2006.01)

(52) U.S. Cl.
CPC .............. *G06T 7/0081* (2013.01); *G06T 7/0097* (2013.01); *G06T 7/2053* (2013.01); *G06T 2207/20081* (2013.01); *G06T 2207/20144* (2013.01)

(58) Field of Classification Search
None
See application file for complete search history.

(56) References Cited

U.S. PATENT DOCUMENTS

2007/0237387 A1 10/2007 Avidan

FOREIGN PATENT DOCUMENTS

JP 2002-74371 A 3/2002

*Primary Examiner* — Atiba O Fitzpatrick
(74) *Attorney, Agent, or Firm* — Canon USA, Inc., IP Division

(57) ABSTRACT

An image processing apparatus stores a background model in which a feature amount is associated with time information for each state at each position of an image to be a background, extracts a feature amount for each position of an input video image, compares the feature amount in the input video image with that of each state in the background model, to determine the state similar to the input video image, and updates the time information of the state similar to the input video image, determines a foreground area in the input video image based on the time information of the state similar to the input video image, detects a predetermined subject from the foreground area, and updates the time information of the state in the background model.

10 Claims, 20 Drawing Sheets

FIG.5

| | COORDINATES | POINTER TO STATE |
|---|---|---|
| BACKGROUND MODEL MANAGEMENT INFORMATION | (0,0) | 1200 |
| | (1,0) | 1202 |
| | ... | ... |

| | | STATE NUMBER | FEATURE AMOUNT | GENERATION TIME | APPEARANCE TIME |
|---|---|---|---|---|---|
| POSITION-BASED BACKGROUND MODEL INFORMATION | ADDRESS 1200 | 1 | 100 | 0 | 300 |
| | ADDRESS 1201 | 2 | 230 | 101 | 35 |
| | ADDRESS 1202 | 1 | 10 | 0 | 315 |
| | ADDRESS 1203 | 2 | 200 | 180 | 20 |
| | | ... | ... | ... | ... |

FIG.6

| COORDINATES | STATE NUMBER | INPUT FEATURE AMOUNT | GENERATION TIME | APPEARANCE TIME | MINIMUM DIFFERENCE VALUE |
|---|---|---|---|---|---|
| (0,0) | 1 | 105 | 0 | 300 | 30 |
| (1,0) | 2 | 203 | 180 | 20 | 120 |
| ... | ... | ... | ... | ... | ... |

FIG.8

| COORDINATES | STATE NUMBER | INPUT FEATURE AMOUNT | GENERATION TIME | APPEARANCE TIME |
|---|---|---|---|---|
| (0,0) | 1 | 105 | 0 | 301 |
| (1,0) | 2 | 203 | 180 | 21 |
| (3,0) | 0 | 240 | 316 | 1 |
| ... | ... | ... | ... | ... |

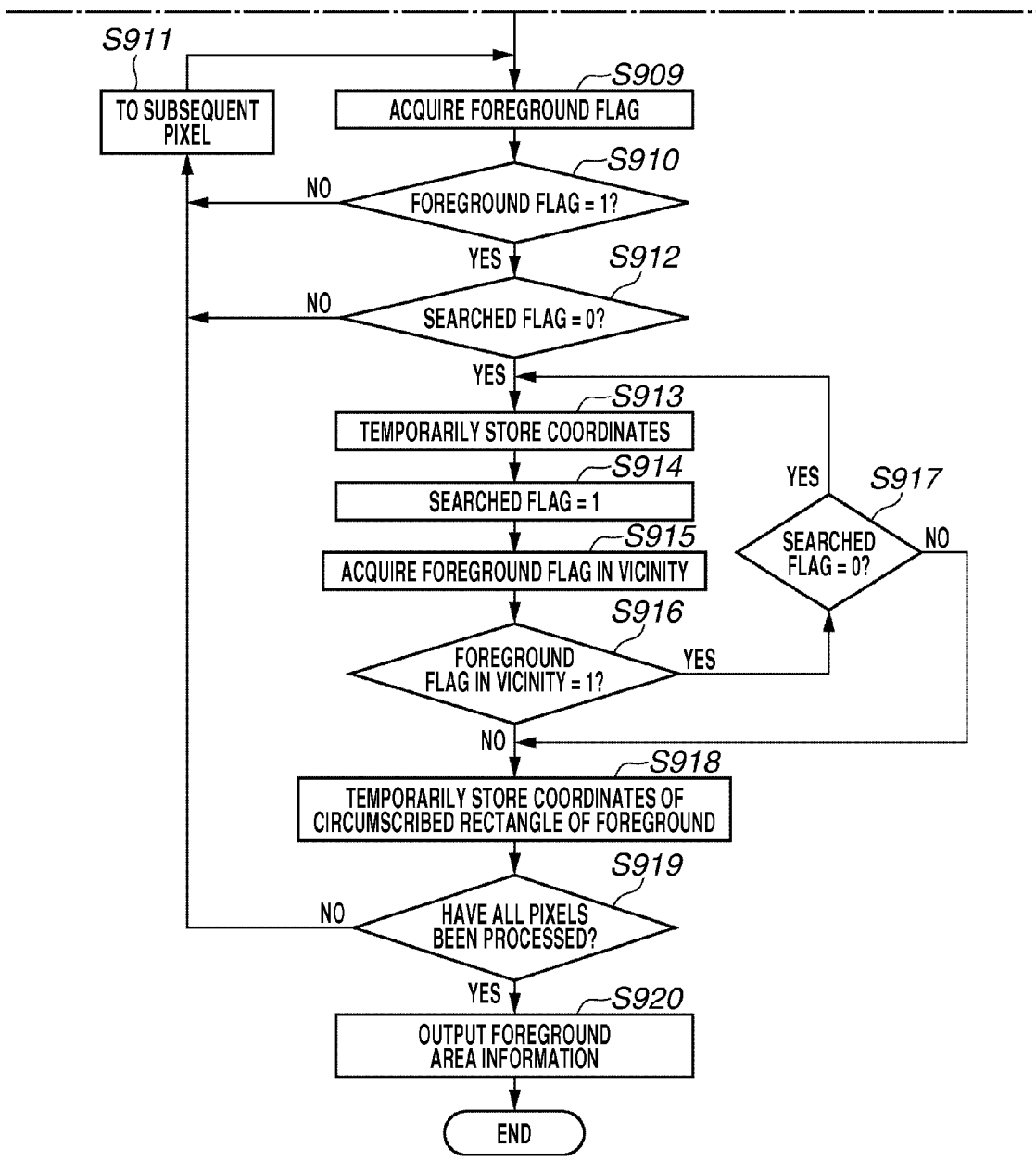

FIG.10

| COORDINATES | FOREGROUND FLAG |
|---|---|
| (0,0) | 0 |
| (1,0) | 1 |
| ⋮ | ⋮ |

FIG.11

| NUMBER OF FOREGROUND AREAS | |
|---|---|
| 2 | |
| FOREGROUND AREA COORDINATE DATA HEAD POINTER | |
| 1400 | |
| UPPER LEFT COORDINATES OF FOREGROUND AREA | LOWER RIGHT COORDINATES OF FOREGROUND AREA |
| (10,15) [ADDRESS 1400] | (40,75) |
| (80,16) [ADDRESS 1401] | (110,74) |

FIG.13

| NUMBER OF OBJECT AREAS | | | |
|---|---|---|---|
| 2 | | | |
| OBJECT AREA COORDINATE DATA HEAD POINTER | | | |
| 1600 | | | |
| | UPPER LEFT COORDINATES OF OBJECT AREA | LOWER RIGHT COORDINATES OF OBJECT AREA | SUBJECT FLAG |
| ADDRESS 1600 | (10,15) | (40,75) | 1 |
| ADDRESS 1601 | (80,16) | (110,74) | 0 |

FIG.20

| COORDINATES | SUBJECT CERTAINTY FACTOR |
|---|---|
| (0,0) | 0 |
| (1,0) | 85 |
| ⋮ | ⋮ |

FIG.21

| COORDINATES | CUMULATIVE SCORE |
|---|---|
| (0,0) | 20 |
| (1,0) | 1000 |
| ⋮ | ⋮ |

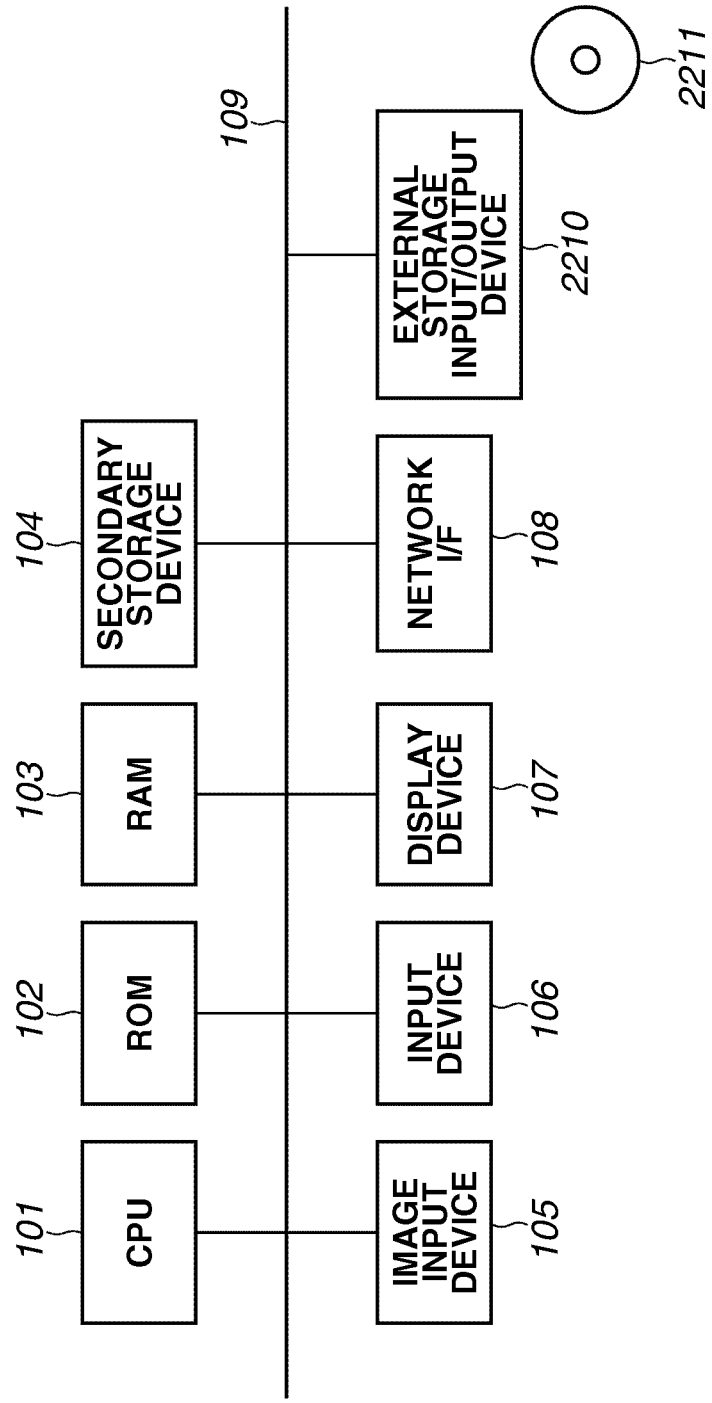

APPARATUS FOR DETECTING OBJECT FROM IMAGE AND METHOD THEREFOR

BACKGROUND OF THE INVENTION

1. Field of the Invention

The present invention relates to an apparatus for detecting an object from an image and a method therefor, and a storage medium storing a program therefor.

2. Description of the Related Art

In recent years, a technique, described below, for detecting an object from an image captured with a camera has been discussed. First, there is a method for detecting a moving object by background subtraction. In the background subtraction, an image of a background including no subject is previously captured with a fixed camera, and a feature amount in the image is stored as a reference model. Then, a difference between the feature amount in the image input from the camera and a feature amount in the reference model is found so that an area, different from the reference model, in the input image is detected as a foreground (a moving object).

There is also a method for detecting a specific subject such as a face or a person from an image. For example, U.S. Patent Application Publication No. 2007/0237387 discusses a technique for detecting a human body. In this technique, a detection window of a predetermined size is scanned on an input image, and it is determined in two classes whether an image in the detection window is a subject.

In this determination, a large number of weak classifiers (discriminators) are effectively combined using AdaBoost to constitute a classifier, to improve determination accuracy. Such classifiers are connected in series, to constitute a cascade-type detector. The weak classifier is composed of a Histogram of Oriented Gradients (HOG) feature amount. The cascade-type detector first removes a candidate for a pattern that is not obviously a subject using the simple classifier in its front stage, and determines whether only the other candidate is a subject using the complicated classifier in its rear stage having a higher identification performance.

Japanese Patent Application Laid-Open No. 2002-74371 discusses a technique for recognizing whether a subject (a person) is detected for only an area of a moving object found by background subtraction. Generally, detection of a subject requires significantly high processing cost because a detection window is scanned in an image and a plurality of classifiers is used each time. Therefore, a subject is detected only for an area of a moving object that has been detected by background subtraction, like in the technique discussed in U.S. Patent Application Publication No. 2007/0237387, so that the whole processing cost can be reduced, compared with that when a subject is detected for the whole area in an image.

When a background starts to be photographed while a subject (a person) exists, however, an area where the person exists at the time of initialization may be stored as a background model. When the person then moves so that a true background that is hidden appears, therefore, a difference between the true background and the background model occurs. Therefore, the true background may be determined to be an area of a foreground.

Even if a search range for detection of a subject is narrowed down by background subtraction, like that in the technique discussed in U.S. Patent Application Publication No. 2007/0237387, an area of a foreground may be widened when a true background is determined to be a foreground. More specifically, the search range for the detection of the subject is not appropriately narrowed down. As a result, the subject may be unable to be detected at high speed.

SUMMARY OF THE INVENTION

According to an aspect of the present invention, an image processing apparatus includes a background model storage unit configured to store a background model in which a feature amount is associated with time information for each of a plurality of states at each position of an image to be a background, a feature amount extraction unit configured to extract a feature amount for each position of an input video image, an input state determination unit configured to compare the feature amount in the input video image with the feature amount of each of the plurality of states in the background model, to determine the state similar to the input video image, and update the time information of the state that has been determined to be similar to the input video image, a foreground determination unit configured to determine a foreground area in the input video image based on the time information of the state that has been determined to be similar to the input video image by the input state determination unit, a subject detection unit configured to detect a predetermined subject from the foreground area, and a background model updating unit configured to update the time information of the state in the background model based on a detection result obtained by the subject detection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of a background model.

FIG. 6 illustrates an example of minimum difference value information.

FIG. 8 illustrates an example of input state information.

FIG. 10 illustrates an example of foreground flag information.

FIG. 11 illustrates an example of foreground area information.

FIG. 13 illustrates an example of object area information.

FIG. 20 illustrates an example of subject certainty factor information.

FIG. 21 illustrates an example of cumulative score information.

FIG. 22 illustrates an example of a hardware configuration of an image processing apparatus.

DESCRIPTION OF THE EMBODIMENTS

Various exemplary embodiments, features, and aspects of the invention will be described in detail below with reference to the drawings.

An exemplary embodiment of the present invention will be described in relation to a technique applicable to an image processing apparatus (a digital imaging apparatus such as a network camera) for detecting a specific subject such as a person, an animal, a vehicle, or an object, or its part from a moving image, image processing software, and an image processing method.

Figure 1:
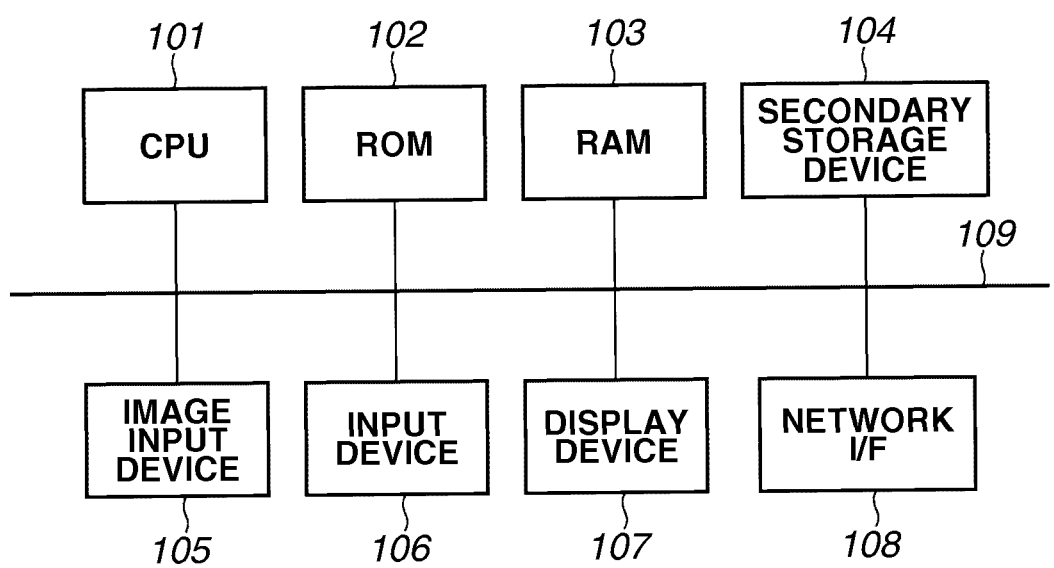
FIG. 1 illustrates an example of a hardware configuration of an image processing apparatus.

FIG. 1 illustrates an example of a hardware configuration of an image processing apparatus according to the present exemplary embodiment. A central processing unit (CPU) 101 executes an instruction according to a program stored in a read-only memory (ROM) 102, a random access memory (RAM) 103, or the like. The ROM 102 is a nonvolatile memory, and stores a program relating to flowcharts, described below, a program required for other control, and data. The RAM 103 is a nonvolatile memory, and stores temporary data such as frame image data and a pattern determination result.

A secondary storage device 104 is a rewritable secondary storage device such as a hard disk drive or a flash memory, and stores image information, an image processing program, and various types of setting information. Such various pieces of information are transferred to the RAM 103, and are used to execute the program by the CPU 101.

An image input device 105 is a digital video camera, a network camera, an infrared camera, or the like, and inputs an image. An input device 106 is a keyboard, a mouse, or the like, and enables input from a user. A display device 107 is a cathode-ray tube (CRT), a liquid crystal display, or the like, and displays a processing result for the user.

A network interface (I/F) 108 is a modem, a local area network (LAN), or the like for making connection to a network such as the Internet or an intranet. The devices 101 to 108 are connected to a bus 109. The bus 109 inputs and outputs data to and from the devices 101 to 108. In the image processing apparatus, an application, which operates on an operating system to be mounted thereon when the CPU 101 executes the program, implements functions of the image processing apparatus, i.e., the whole or a part of the processing relating to flowcharts, described below.

Figure 2:
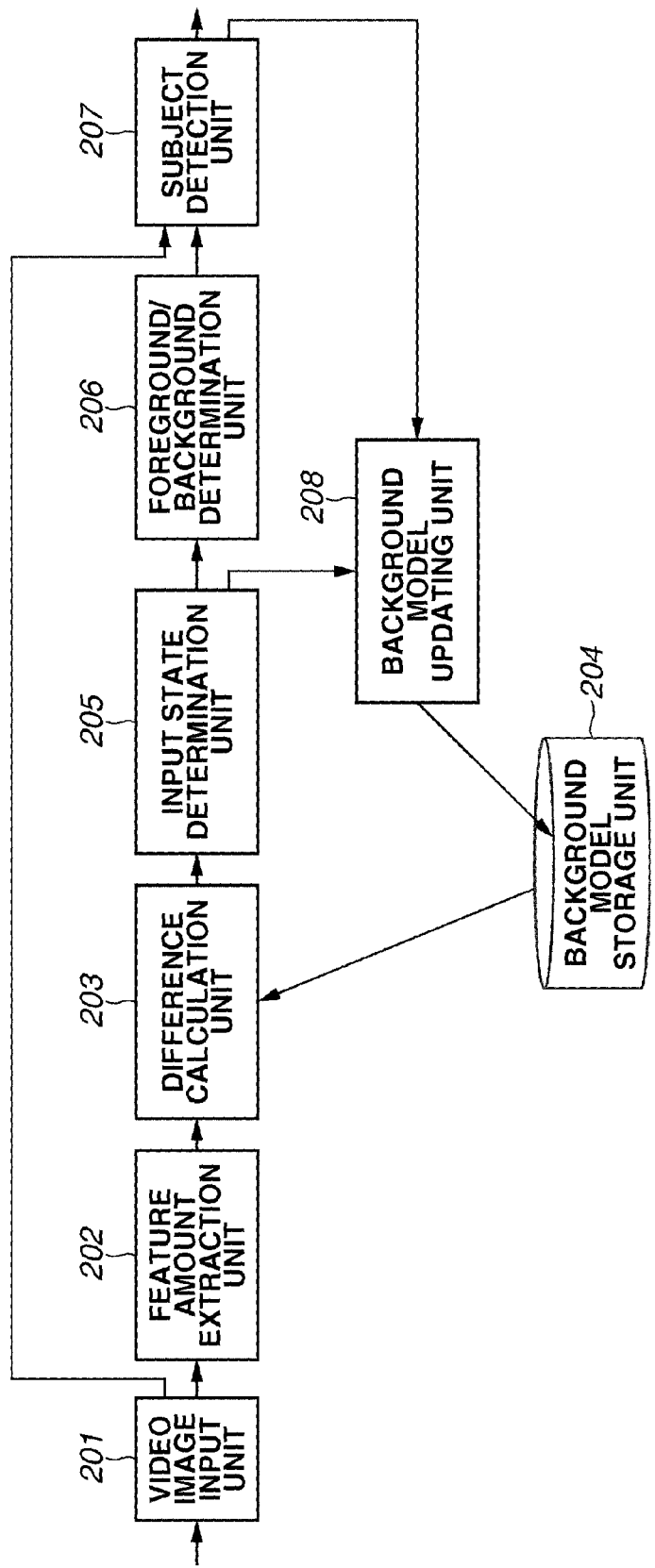
FIG. 2 illustrates an example of a functional configuration of the image processing apparatus.

FIG. 2 illustrates an example of a functional configuration of the image processing apparatus. A video image input unit 201 is implemented by the image input device 105 or the like, and inputs a video image. A feature amount extraction unit 202 extracts a feature amount from the input video image.

A difference calculation unit 203 finds a difference between the input video image and a background model read out by a background model storage unit 204. The background model storage unit 204 is implemented by the RAM 103, the secondary storage device 104, or the like, and stores a state of each position in the input video image as a background model represented by an image feature amount. Details of the background model will be described below. An input state determination unit 205 determines a state, in the background model, close to the input video image based on a result obtained by the difference calculation unit 203.

A foreground/background determination unit 206 determines whether each position in the input video image is a foreground or a background based on a result obtained by the input state determination unit 205. A subject detection unit 207 detects an area of a specific subject (a human body in the present exemplary embodiment) from an area, which has been determined to be a foreground in the foreground/background determination unit 206, in the input video image from the video image input unit 201.

A background model updating unit 208 updates the background model stored in the background model storage unit 204 based on the result obtained by the input state determination unit 205 and a result obtained by the subject detection unit 207.

Figure 3:
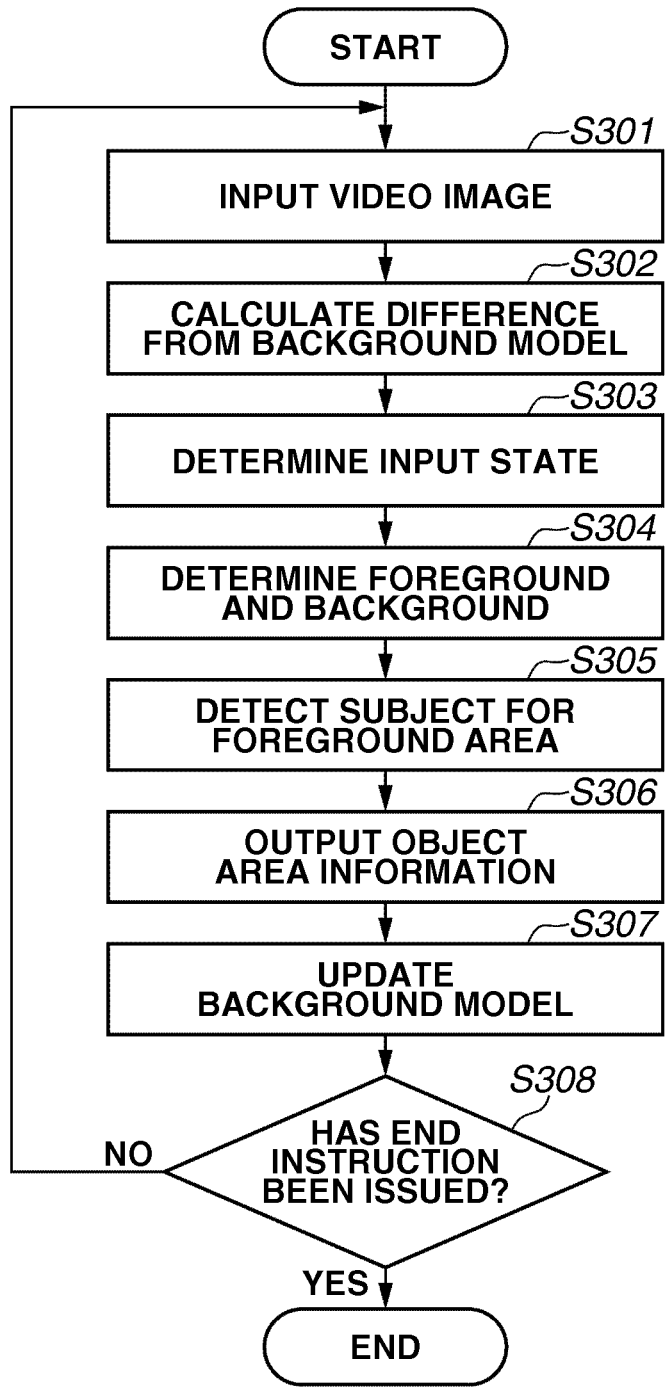
FIG. 3 illustrates an example of a flowchart relating to image processing.

A flow of main image processing in the image processing apparatus will be described below with reference to FIG. 3. FIG. 3 illustrates an example of a flowchart relating to the image processing.

In step S301, the video image input unit 201 acquires a frame image for each predetermined time when a video image is input thereto by being captured, for example. In step S302, the feature amount extraction unit 202 extracts a feature amount from the acquired frame image, and the difference calculation unit 203 reads out respective feature amounts of a plurality of states in the background model from the background model storage unit 204, and calculates a difference between each of the read feature amounts and the feature amount in the frame image.

In step S303, the input state determination unit 205 then determines, out of the plurality of states in the background model, the state close to the frame image based on the result obtained by the difference calculation unit 203. In step S304, the foreground/background determination unit 206 then divides an area in the video image into a foreground area and a background area for each partial area.

In step S305, the subject detection unit 207 then detects a subject for the foreground area found by the foreground/background determination unit 206. In step S306, a control unit (not illustrated) outputs information relating to an object (e.g., object area information, described below) detected by the subject detection unit 207 to the display device 107. The information relating to the object is used for applications such as overwriting of a rectangle representing an object area on an input video image.

In step S307, the background model updating unit 208 then reflects the result obtained by the input state determination unit 205 and the result obtained by the subject detection unit 207, and updates the background model. In step S308, the control unit then determines whether an end instruction is received from the user by turning off power, for example. At this time, if the control unit determines that the end instruction has been received (YES in step S308), the processing ends. On the other hand, if the control unit determines that the end instruction has not been received (NO in step S308), the processing proceeds to step S301. More specifically, the processing from step S301 to step S307 is repeated until the end instruction is issued.

Figure 4:
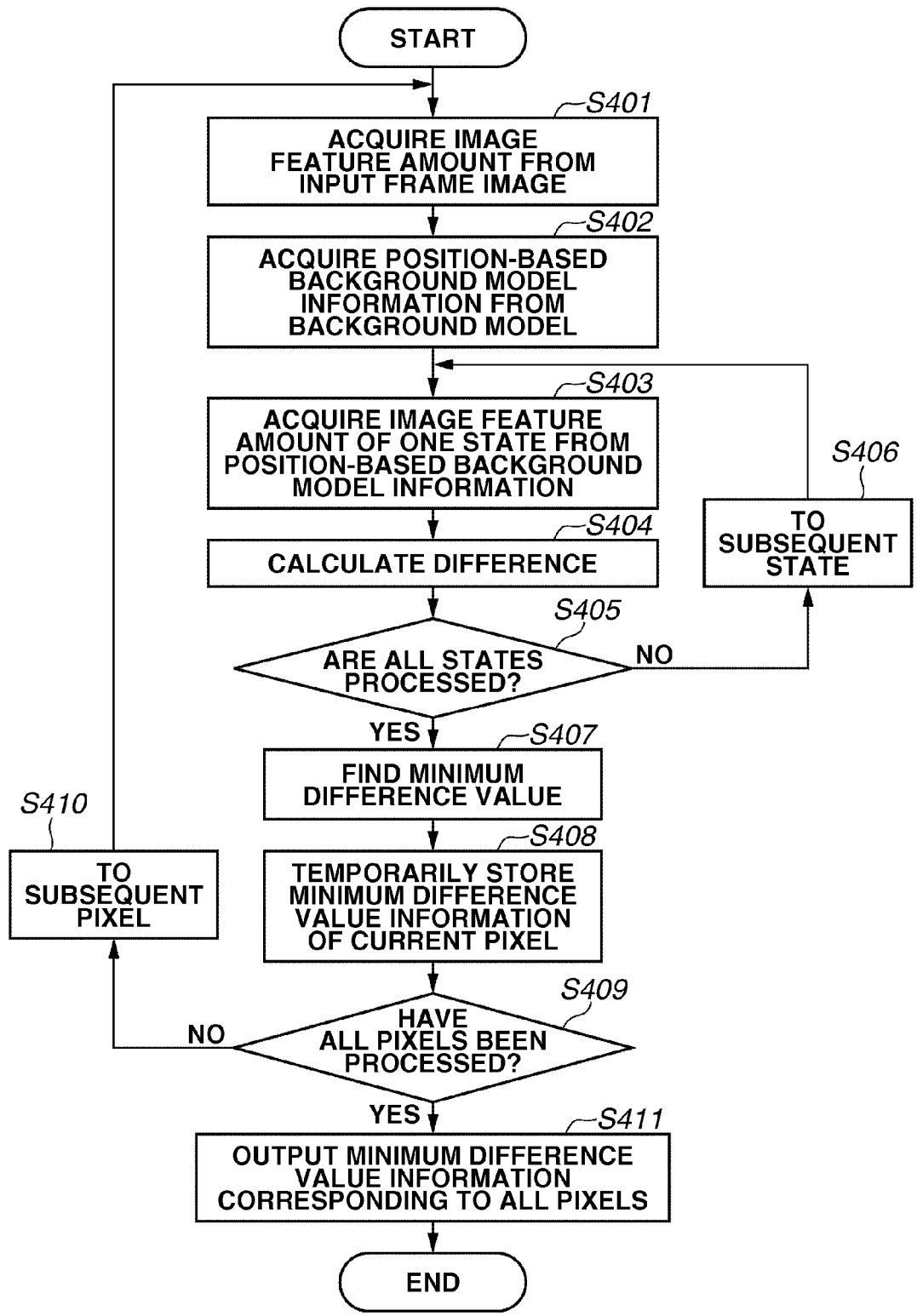
FIG. 4 illustrates an example of a flowchart relating to difference calculation processing.

Details of the difference calculation processing in step S302 will be described below with reference to FIG. 4. FIG. 4 illustrates an example of a flowchart relating to the difference calculation processing.

In step S401, the feature amount extraction unit 202 first extracts an image feature amount as a value representing a state at each position from the frame image acquired by the video image input unit 201. While examples of the image feature amount include a luminance, a color, and an edge, the present invention is not particularly limited to these. The image feature amount may be a feature amount for each pixel or a feature amount for each partial area. Examples of the feature amount for each partial area include an average luminance of pixels in an 8×8 pixel block and a discrete cosine transform (DCT) coefficient. The DCT coefficient is a result of discrete cosine transform.

If the frame image is compression-coded in a Joint Photographic Experts Group (JPEG) format, a feature amount has already been extracted during the image compression. Therefore, in this case, the DCT coefficient may be directly extracted from the frame image in the JPEG format and used as a feature amount.

In the present exemplary embodiment, a luminance for each pixel is used as the image feature amount. A processing target moves rightward from the left and downward for each row (hereinafter referred to as a raster scan order, as needed) using a pixel at the upper left of the frame image as a starting point, to perform the subsequent processing.

In step S402, the difference calculation unit 203 reads out position-based background model information at a target position (a position of a pixel to be processed) from the background model stored in the background model storage unit 204, and temporarily stores the read position-based background model information in the RAM 103.

The background model stored in the background model storage unit 204 will be described with reference to FIG. 5. FIG. 5 illustrates an example of the background model. The background model is a representation of a state of each position in a frame image by an image feature amount. The background model includes two types of information, i.e., background model management information and position-based background model information.

The background model management information includes positional information relating to a position of each pixel and a pointer to the position-based background model information at the position. The positional information may be a representation of a position of each pixel in a frame image in X-Y coordinates or may be a number assigned to a position of each pixel in an 8×8 pixel block in the raster scan order. In the present exemplary embodiment, the positional information is a representation of a position of each pixel in a frame image in X-Y coordinates.

The position-based background model information stores a plurality of states corresponding to each position. The plurality of states stored in the position-based background model information enables a background that changes with time by appearance of a new still object (e.g., a vase) to be realized. Each of the states stores a state number, an image feature amount representing the state, a generation time, and an appearance time.

The state number is a number for identifying each of the states. The state numbers are assigned in ascending order of their numbers. The generation time is the time when the state is first generated in the background model, and is represented by an actual time or a frame number. In the present exemplary embodiment, the generation time is represented by a frame number. The appearance time is represented by the time when in a period elapsed since the state was generated until the present time, a similar state has appeared in an input video image or the number of frames. In the present exemplary embodiment, the appearance time is represented by the number of frames.

The plurality of states at the same position in the frame image is continuously stored at a destination referred to by the pointer in the background model management information. In the example illustrated in FIG. 5, for a position represented by coordinates (0, 0), a state with a state number "1" is stored in address 1200, and a state with a state number "2" is then stored in address 1201.

For example, all states corresponding to a target position are read out when the difference calculation unit 203 refers to pointers at the target position and the subsequent position from the background model management information and reads out states from an address at the target position to an address preceding an address at the subsequent position.

Return to description of step S402. In step S402, the difference calculation unit 203 refers to the pointer to the position-based background model information at the target position from the background model management information, and reads out the position-based background model information including all the states at the target position.

In the example illustrated in FIG. 5, when the target pixel is the first position, the difference calculation unit 203 reads out position-based background model information including two states, described below. As the position-based background model information corresponding to the first state, a state number "1", a feature amount "100", a generation time "0", and an appearance time "300" are readout of address 1200. As the position-based background model information corresponding to the second state, a state number "2, a feature amount "230", a generation time "101", and an appearance time "35" are read out of address 1201.

In step S403, the difference calculation unit 203 then reads out the feature amount of the one state from the position-based background model information at the target position, which has been read out in step S402. In step S404, the difference calculation unit 203 calculates a difference value between the read feature amount of the one state and a feature amount at the same position in the frame image. While a method for calculating the difference value uses an absolute value of the difference value between the two feature amounts, the present invention is not particularly limited to this. For example, the square of the difference value may be used. The difference calculation unit 203 temporarily stores the difference value in the RAM 103 in association with the position in the frame image and a state number of a state where the difference value has been calculated.

In step S405, the difference calculation unit 203 determines whether there exists a state where the difference value has not been calculated at the target position. At this time, if the difference calculation unit 203 determines that the state exists (NO in step S405), the processing proceeds to step S406. On the other hand, if the difference calculation unit 203 determines that the state does not exist (YES in step S405), the processing proceeds to step S407. In step S406, the difference calculation unit 203 advances the processing target to the subsequent state, and the processing then proceeds to step S403.

In step S407, the difference calculation unit 203 finds, out of difference values between the feature amount in the frame image and the feature amounts of all the states, the minimum difference value for the target position. In step S408, the difference calculation unit 203 then associates the minimum difference value at this time with a state number of the corresponding state, a generation time, an appearance time, the feature amount in the frame image, and coordinates in the frame image, to temporarily store the minimum difference value as minimum difference value information (one example of which is illustrated in FIG. 6) in the RAM 103.

In step S409, the difference calculation unit 203 then determines whether all pixels (coordinates) in the frame image have been processed. If it is determined that all the pixels have been processed (YES in step S409), the processing proceeds to step S411. On the other hand, if it is determined that not all the pixels have been processed (NO in step S409), the processing proceeds to step S410. In step S410, the difference calculation unit 203 advances the processing target to the subsequent pixel in the raster scan order, and the processing then proceeds to step S401.

In step S411, the difference calculation unit 203 outputs the minimum difference value information corresponding to all the pixels temporarily stored to the input state determination unit 205.

When the image processing apparatus is started, the background model has not been stored. Therefore, a maximum value that can be taken as a difference value is set when the difference value is calculated. Such states are determined to be new, described below, and are stored as the background model. Thus, the frame image at the time of startup initializes the background model.

The foregoing is details of the difference calculation processing in step S302.

Figure 7:
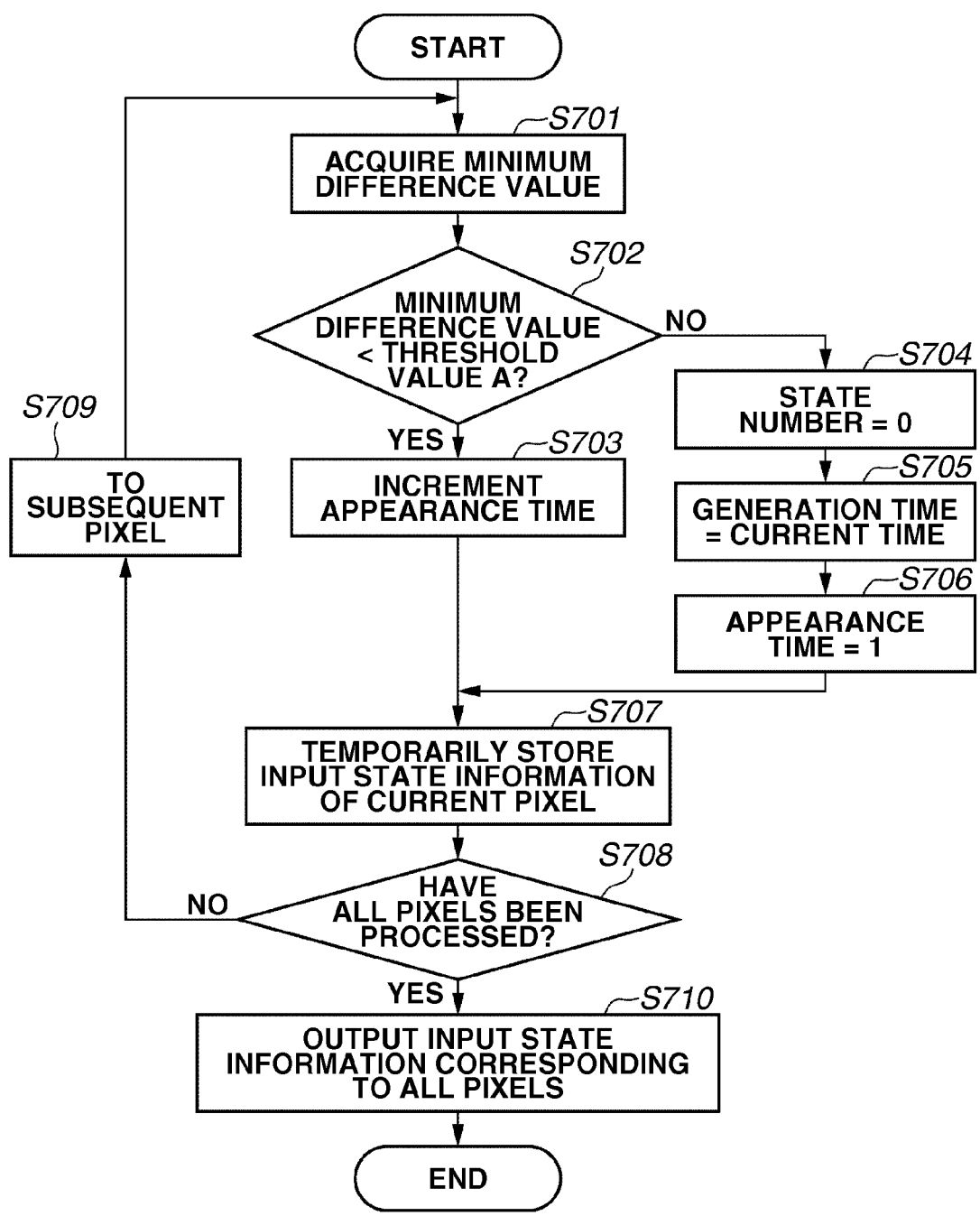
FIG. 7 illustrates an example of a flowchart relating to input state determination processing.

Details of the input state determination processing in step S303 will be described below with reference to FIG. 7. FIG. 7 illustrates an example of a flowchart relating to the input state determination processing.

In step S701, the input state determination unit 205 first acquires a minimum difference value as a result of the difference calculation processing in step S302. More specifically, the input state determination unit 205 refers to coordinates in minimum difference value information (FIG. 6) one at a time while moving in the raster scan order using the upper left pixel in the frame image as a starting point, to acquire the minimum difference value.

In step S702, the input state determination unit 205 then compares a minimum difference value at a target position with a threshold value A. At this time, if the minimum difference value is smaller than the threshold value A (YES in step S702), the input state determination unit 205 determines that the state is similar to a state stored in the background model, and the processing then proceeds to step S703. On the other hand, if the minimum difference value is equal to or larger than the threshold value A (NO in step S702), the input state determination unit 205 determines that the state differs from any state stored in the background model and is a new state, and the processing then proceeds to step S704.

In step S703, the input state determination unit 205 increments an appearance time in the minimum difference value information (FIG. 6). The appearance time is represented by the number of frames. When the state is similar to the state stored in the background model, states having the same feature can be considered to have appeared in a video image. Therefore, "1", for example, is added to the appearance time.

In step S704, the input state determination unit 205 sets a special number (e.g., 0) meaning a new state as a state number. A state number "0" is assigned again when the background model updating unit 208 updates the background model. In step S705, the input state determination unit 205 then sets the current time to a generation time as the time when the state is first generated. While in the present exemplary embodiment, the current frame number is used, a normal time such as any hour, any minute, and any second may be used. In step S706, the input state determination unit 205 then sets the appearance time (the number of frames) to "1" because the state has newly appeared.

In step S707, the input state determination unit 205 then temporarily stores a state number, a feature amount in the frame image, a generation time, and an appearance time as input state information (one example of which is illustrated in FIG. 8) in the RAM 103 in association with coordinates in the frame image.

In step S708, the input state determination unit 205 determines whether all pixels (coordinates) in the frame image have been processed. At this time, if it is determined that all the pixels have been processed (YES in step S708), the processing proceeds to step S710. On the other hand, if it is determined that not all the pixels have been processed (NO in step S708), the processing proceeds to step S709. In step S709, the input state determination unit 205 advances the processing target to the subsequent pixel in the raster scan order, and the processing then proceeds to step S701.

As described above, the difference value is set to the maximum value for the frame image at the start of the image processing apparatus. Therefore, it is determined that all the states are new in step S702.

In step S710, the input state determination unit 205 outputs input state information corresponding to all pixels to the foreground/background determination unit 206 and the background model updating unit 208.

The foregoing is details of the input state determination unit in step S303.

Figure 9:
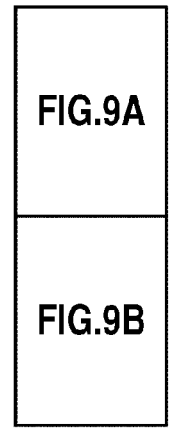
FIG. 9, which is composed of FIGS. 9A and 9B, illustrates an example of a flowchart relating to foreground/background determination processing.
Figure 9A:
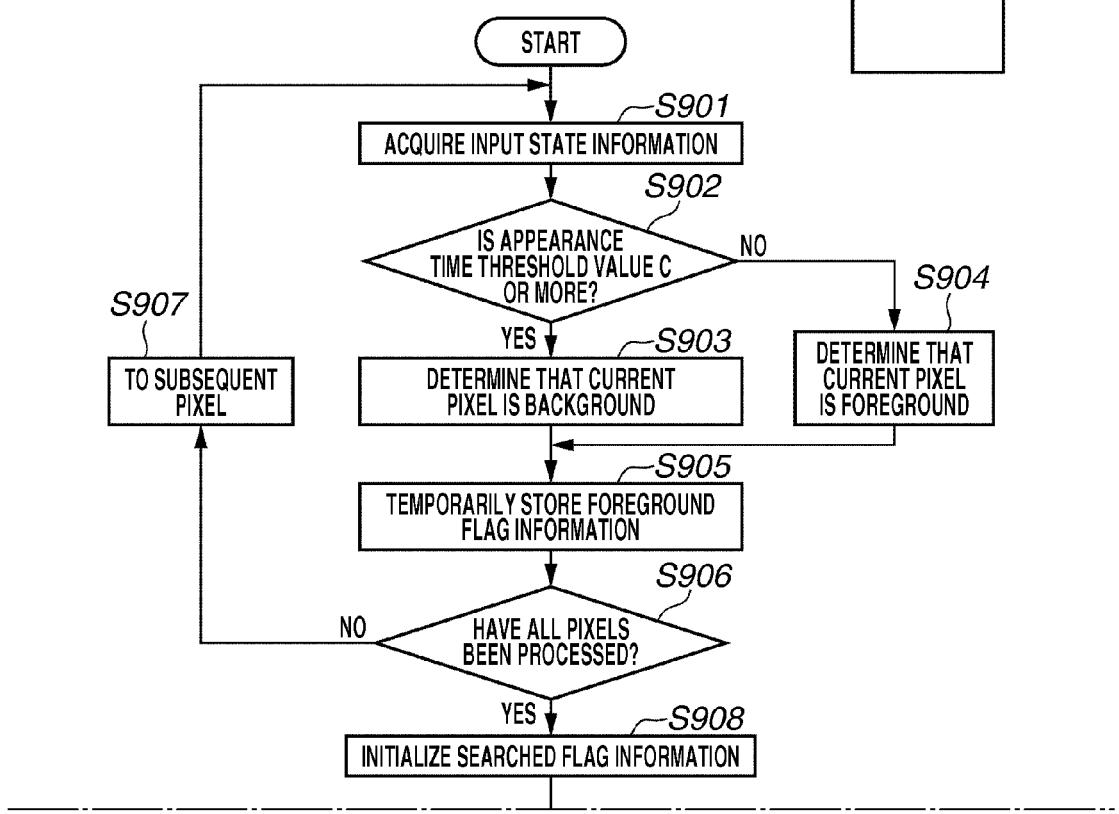

Details of the foreground/background determination processing in step S304 will be described below with reference to FIG. 9. FIG. 9, which is composed of FIGS. 9A and 9B, illustrates an example of a flowchart relating to the foreground/background determination processing.

In step S901, the foreground/background determination unit 206 first acquires input state information (FIG. 8) as a result of the input state determination processing in step S303. More specifically, the foreground/background determination unit 206 refers to pixels one at a time in the raster scan order using the upper left pixel in the frame image as a starting point, to acquire the input state information.

In step S902, the foreground/background determination unit 206 then determines whether a pixel to be processed (current pixel) is a foreground using time information. Examples of the time information include an appearance time and an existence time (a time elapsed since a certain state (feature) appeared in a video image until the present, i.e., a time corresponding to a difference between the current time and a generation time). More specifically, the time information relating to a specific state can be used, as needed.

In the present exemplary embodiment, the appearance time is used. The foreground/background determination unit 206 compares the appearance time with the threshold value C. At this time, if the appearance time is the threshold value C or more (YES in step S902), the foreground/background determination unit 206 can consider the current pixel as a background because the pixel has existed for a sufficiently long time, and thus the processing then proceeds to step S903. On the other hand, if the appearance time is less than the threshold value C (NO in step S902), the foreground/background determination unit 206 cannot consider the current pixel as a background because the pixel has not existed for a sufficiently long time to be considered as a background, and thus the processing proceeds to step S904.

In step S903, the foreground/background determination unit 206 determines that the current pixel is a background. For example, the foreground/background determination unit 206 sets a foreground flag to "0" meaning a background. In step S904, the foreground/background determination unit 206 determines that the current pixel is a foreground. For example, the foreground/background determination unit 206 sets the foreground flag to "1" meaning a foreground.

In step S905, the foreground/background determination unit 206 then temporarily stores the foreground flag as foreground flag information (one example of which is illustrated in FIG. 10) in association with coordinates of the current pixel in the frame image.

In step S906, the foreground/background determination unit 206 then determines whether all pixels (positions) in the frame image have been processed. At this time, if it is determined that all the pixels have been processed (YES in step S906), the processing proceeds to step S908. On the other hand, if it is determined that not all the pixels have been processed (NO in step S906), the processing proceeds to step S907. In step S907, the foreground/background determination unit 206 advances the processing target to the subsequent pixel, and the processing then proceeds to step S901. In the processing from step S908 to S919, described below, the foreground/background determination unit 206 integrates the continuous pixels in the foreground, to find a foreground area.

In step S908, the foreground/background determination unit 206 initializes searched flag information. More specifically, in the present exemplary embodiment, searched flag information indicating whether the pixel at which the foreground flag is "1" has been searched for is prepared to integrate the pixels in the foreground as the foreground area. The searched flag information represents a searched flag associated with coordinates in the frame image, similarly to foreground flag information. The foreground/background determination unit 206 interprets the current pixel as having already been searched for when the searched flag is "1", to initialize searched flags corresponding to all coordinates to "0".

In step S909, the foreground/background determination unit 206 refers to coordinates in foreground flag information (FIG. 10) in the RAM 103 using the pixel at the upper left of the frame image as a starting point, to acquire the foreground flag.

In step S910, the foreground/background determination unit 206 then checks whether a foreground flag corresponding to the current coordinates is "1". At this time, if it is determined that the foreground flag is "0" (NO in step S910), the processing proceeds to step S911 because the current pixel is a background. On the other hand, if it is determined that the foreground flag is "1" (YES in step S910), the processing proceeds to step S912 because the current pixel is a foreground.

In step S911, the foreground/background determination unit 206 advances the processing target from the current pixel to the subsequent pixel in the raster scan order, and the processing then proceeds to step S909.

In step S912, the foreground/background determination unit 206 checks whether a searched flag corresponding to the current coordinates is "0", i.e., the current pixel has not been searched for yet because the current pixel is a foreground. At this time, if the foreground/background determination unit 206 determines that the searched flag is "1" (No in step S912), the processing proceeds to step S911 because the current pixel has already been searched for. On the other hand, if the foreground/background determination unit 206 determines that the searched flag is "0" (YES in step S912), the processing proceeds to step S913 because the current pixel has not been searched for yet.

In step S913, the foreground/background determination unit 206 temporarily stores the current coordinates. In step S914, the foreground/background determination unit 206 sets the searched flag to "1" because the current pixel has been searched for. In step S915, the foreground/background determination unit 206 then acquires a foreground flag in its vicinity to search for the continuous pixels in the foreground.

In step S916, the foreground/background determination unit 206 then checks whether the foreground flag in its vicinity is "1". At this time, if the foreground flag is "1" (YES in step S916), the foreground/background determination unit 206 determines that the continuous pixels have been searched for, and the processing proceeds to step S917. On the other hand, if the foreground flag is "0" (NO in step S916), the processing proceeds to step S918. In step S917, the foreground/background determination unit 206 determines whether the searched flag is "0". At this time, if the searched flag is "0" (YES in step S917), the foreground/background determination unit 206 determines that the current pixel has not been searched for yet, and the processing proceeds to step S913 to further search for its vicinities. On the other hand, if the searched flag is "1" (NO in step S917), the processing proceeds to step S918.

The processing from step S913 to step S917 is repeated until the vicinities have already been searched for (searched flag=1) (No in step S917) or all the vicinities are backgrounds (foreground flag=0) (NO in step S916).

In step S918, i.e., if the continuous pixels in the foreground have been searched for in the processing from step S913 to S917, the foreground/background determination unit 206 finds a circumscribed rectangle from coordinates of the pixels temporarily stored, and temporarily stores the lower right coordinates and the upper left coordinates in the RAM 103.

In step S919, the foreground/background determination unit 206 then determines whether the processing from step S909 to S918 has been performed for all the pixels in the frame image. At this time, if the foreground/background determination unit 206 determines that the processing has not been performed (NO in step S919), the processing proceeds to step S911. On the other hand, if it is determined that the processing has been performed (YES in step S919), the processing proceeds to step S920.

In step S920, the foreground/background determination unit 206 outputs the foreground area information. More specifically, if it is determined that the processing from step S909 to step S918 is performed for all the pixels (YES in step S919), the foreground/background determination unit 206 counts the number of lower right coordinates and upper left coordinates of the foreground area, which are temporarily stored. The foreground/background determination unit 206 outputs the lower right coordinates and the upper left coordinates of the foreground area and an average appearance time, together with the number of foreground areas, to the subject detection unit 207 as foreground area information (one example of which is illustrated in FIG. 11).

FIG. 11 illustrates an example of the foreground area information. A foreground area coordinate data head pointer is a pointer for accessing the upper left coordinates and the lower right coordinates of each of foreground areas (rectangular areas). In the example illustrated in FIG. 11, there exist two foreground areas, and upper left coordinates and lower right coordinates of each of the two foreground areas can be read-out in order from address 1400 to address 1401 pointed to by the foreground area coordinate data head pointer.

The foregoing is details of the foreground/background determination processing in step S304.

Details of the subject detection processing from the foreground area in step S305 will be described below with reference to FIG. 12.

Figure 12:
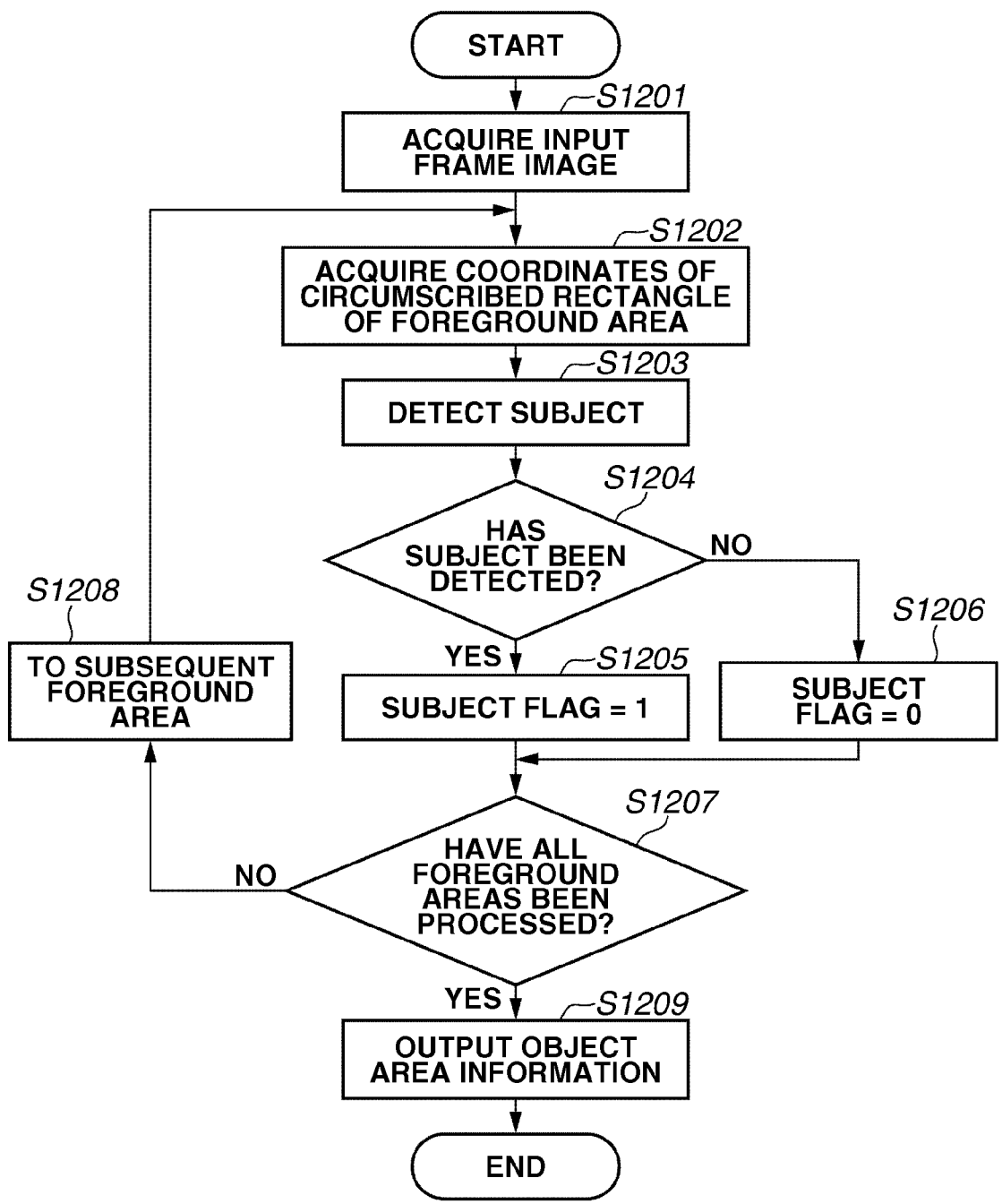
FIG. 12 illustrates an example of a flowchart relating to subject detection processing.

FIG. 12 illustrates an example of a flowchart relating to the subject detection processing.

In step S1201, the subject detection unit 207 first acquires a frame image from the video image input unit 201. In step S1202, the subject detection unit 207 then acquires coordinates of a circumscribed rectangle of one foreground area from the foreground area information (FIG. 11) serving as a result of the foreground background determination processing in step S304. In step S1203, the subject detection unit 207 then scans a detection window only for the acquired foreground area using the method discussed in U.S. Patent Application Publication No. 2007/0237387, for example, to detect a subject.

In step S1204, the subject detection unit 207 then determines whether the subject has been detected. At this time, if the subject detection unit 207 detects that the subject has been detected (YES in step S1204), the processing proceeds to step S1205. On the other hand, if the subject detection unit 1207 detects that the subject has not been detected (NO in step S1204), the processing proceeds to step S1206. In step S1205, the subject detection unit 207 sets a subject flag to "1", and the processing then proceeds to step S1207. In step S1206, the subject detection unit 207 sets the subject flag to "0", and the processing then proceeds to step S1207.

In step S1207, the subject detection unit 207 determines whether all foreground areas included in the foreground area information (FIG. 11) have been processed (FIG. 11). At this time, if the subject detection unit 207 determines that all the foreground areas have been processed (YES in step S1207), the processing proceeds to step S1209. On the other hand, if the subject detection unit 207 determines that not all the foreground areas have been processed (NO in step S1207), the processing proceeds to step S1208. In step S1208, the subject detection unit 207 advances the processing target to the subsequent foreground area, and the processing then proceeds to step S1202.

In step S1209, if the processing from step S1202 to step S1206 is performed for all the foreground areas, the subject detection unit 207 outputs the foreground area information with a subject flag added thereto to a unit (e.g., the control unit) outside the subject detection unit 207 and the background model updating unit 208 as object area information (one example of which is illustrated in FIG. 13).

FIG. 13 illustrates an example of the object area information. An object area coordinate data head pointer is a pointer for accessing upper left coordinates and lower right coordinates of each object area (rectangular area). In an example illustrated in FIG. 13, two object areas exist. Upper left coordinates and lower right coordinates of each of the object areas, an average appearance time, and a subject flag can be readout in order from address 1600 to address 1601 pointed to by the object area coordinate data head pointer.

The foregoing is details of the subject detection processing from the foreground area in step S305.

The object area information is used in the following manner. For example, a device for detecting entry of a subject into an area within a screen designated by a user acquires only an object area where the subject flag is "1" from the object area information. The device determines whether the subject enters a range designated by the user from the lower right coordinates and the upper left coordinates of the object area.

Figure 14:
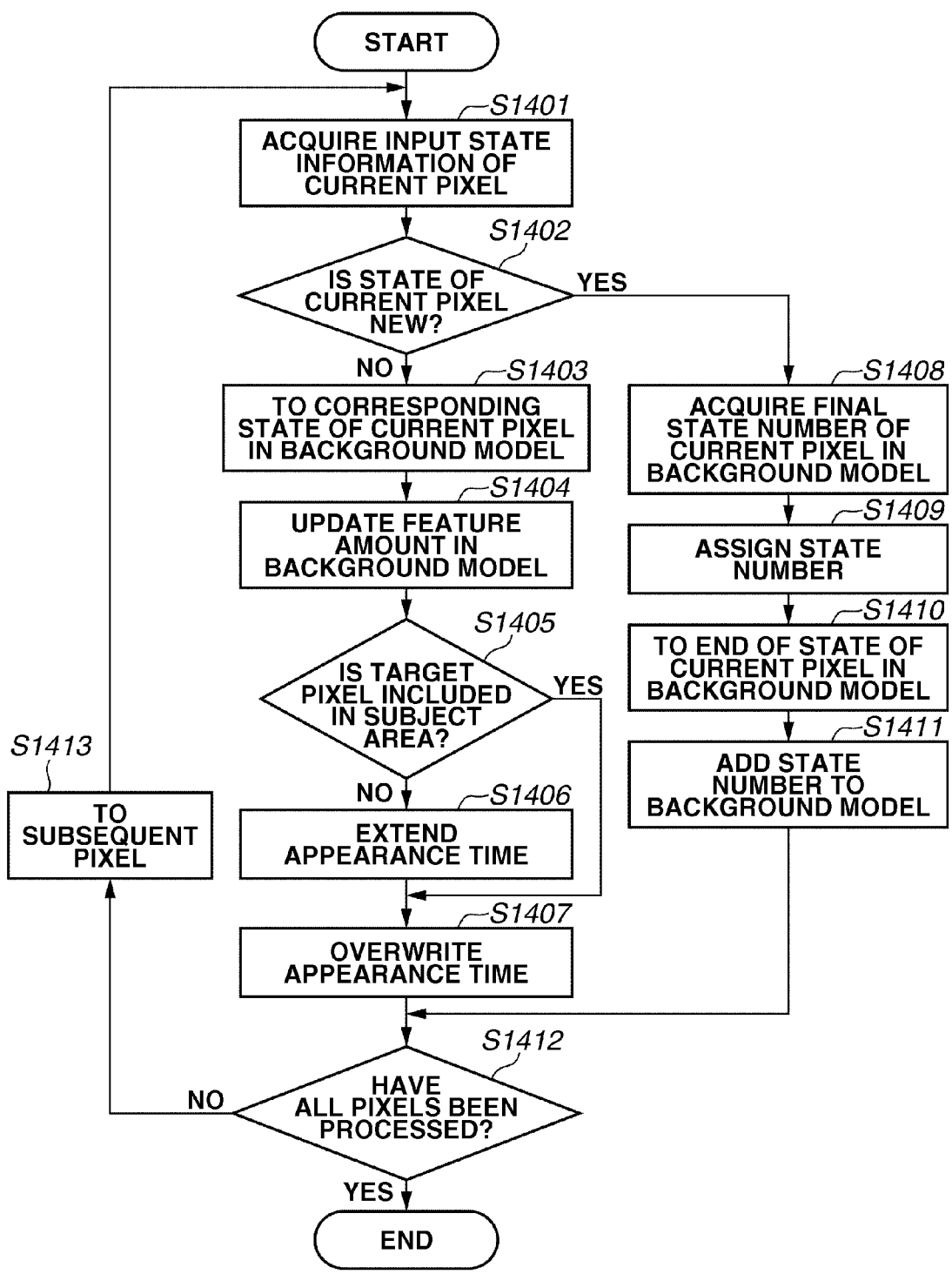
FIG. 14 illustrates an example of a flowchart relating to updating processing.

Details of the processing for updating the background model in step S307 will be described below with reference to FIG. 14. FIG. 14 illustrates an example of a flowchart relating to the updating processing.

In step S1401, the background model updating unit 208 first sequentially acquires input state information corresponding to one pixel from the input state information (FIG. 8) output from the input state determination unit 205 using the upper left pixel in the frame image as a starting point with reference to its coordinates.

In step S1402, the background model updating unit 208 then checks whether a state of the current pixel is new. The background model updating unit 208 refers to a state number in input state information, to determine that the state is new if the state number is "0", and determines that the state is a state existing in the background model if the state number is other than "0". At this time, if the background model updating unit 208 determines that the state is new (YES in step S1402), the processing proceeds to step S1408. On the other hand, if the background model updating unit 208 determines that the state is the existing state (NO in step S1402), the processing proceeds to step S1403.

In step S1403, the background model updating unit 208 updates corresponding position-based background model information in the background model (FIG. 5). More specifically, the background model updating unit 208 refers to background model management information in the background model from coordinates of the current pixel, to acquire a pointer to a state of coordinates that match the coordinates of the current pixel. The background model updating unit 208 sequentially advances the pointer while reading out a state number from the input state information, to refer to position-based background model information that matches the read state number.

In step S1404, the background model updating unit 208 then updates a feature amount in the background model using a feature amount in the input state information. This is for coping with a change due to a change in illumination. As an updating method, the following equation (1) is used, for example, where t is a current frame, t−1 is a frame preceding the current frame, $\mu_{t-1}$ is a value of a feature amount before updating, $\mu_t$ is a value of the feature amount after updating, $I_t$ is a value of a feature amount in the frame image, and $\alpha$ is a weight having a value from 0 to 1 (the larger the value is, the closer a value after updating is to an input value):

$$\mu_t = (1-\alpha) \cdot \mu_{t-1} + \alpha \cdot I_t \tag{1}$$

In step S1405, the background model updating unit 208 then refers to the object area information (FIG. 13) serving as a subject detection result, to check whether a target pixel is included in a subject area. At this time, if it is determined that the target pixel is included in the subject area (YES in step S1405), the processing proceeds to step S1407. On the other hand, if it is determined that the target pixel is not included in the subject area (the target pixel is included in the object area, and the subject flag is "0") (NO in step S1405), the processing proceeds to step S1406.

If it is determined that the target pixel is not included in the subject area, the target pixel may be actually a background, although the foreground/background determination unit 206 determines that it is a foreground.

Therefore, in step S1406, the background model updating unit 208 adds a fixed amount to an appearance time in the input state information to extend the appearance time, to determine that the target pixel is a background in the subsequent foregoing/background determination processing in step S902. While a method for extending the appearance time to the threshold value C at one time as an extension amount, the extension amount may be a predetermined fixed amount B because the determination by the subject detection unit 207 is not always correct. If the target pixel is truly a background, the subject is not continuously detected, and the appearance time is extended by the fixed amount B each time to reach the threshold value C. Therefore, it is determined that the target pixel is a background in step S902.

If an existence time (a current time–a generation time) is used in the determination in step S902, the existence time is extended by subtracting the fixed amount from the generation time to get the previous time stored in the background model, for example.

In step S1407, the background model updating unit 208 then updates the appearance time in the background model by writing the appearance time in the input state information over the appearance time in the background model.

While the appearance time and the existence time are used as the time information in the present exemplary embodiment, a threshold value C of a time elapsed until it is determined that the target pixel is a background may be retained as time information when a state is first added to the background model. In this case, when it is determined in step 702 that a similar state exists in the background model, the time information is decremented in step S703. Therefore, in such a case, if it is determined that the subject is not detected (NO in step S1405), the processing proceeds to step S1406. In step S1406, the time information is corrected to be shortened.

Only the foreground area where the subject detection unit 207 has not detected the subject is taken as a target, and the target pixel is reflected in the background model as being highly likely to be a background. If the subject detection unit 207 detects human bodies, for example, however, an area including pixels corresponding to a background around the human body becomes a detection result because a feature common to the human bodies is mainly the contours of the human bodies. More specifically, if the pixel corresponding to the background included in the area detected by the subject detection unit 207 can also be reflected in the background model, the accuracy of the background model can be further enhanced.

A method for implementing the foregoing first includes a method using an overlap of an area serving as a result of the foreground/background determination processing and an area serving as a result of the subject detection processing. More specifically, an appearance time (or an existence time) of a corresponding pixel in the background model updating unit 208 is extended, considering an area other than the overlap of the foreground area and the subject area as a background.

Details of a method for finding an overlap area will be described below.

The foreground/background determination unit 206 first outputs the foreground flag information (FIG. 10) generated when the processing from step S901 to step S905 illustrated in FIG. 9 ends to the background model updating unit 208. The background model updating unit 208 finds a logical product area (one example of which is illustrated in FIG. 15) of a foreground area obtained from the foreground flag information and a subject area where a subject flag is "1" in an object area output from the subject detection unit 207.

Figure 15:
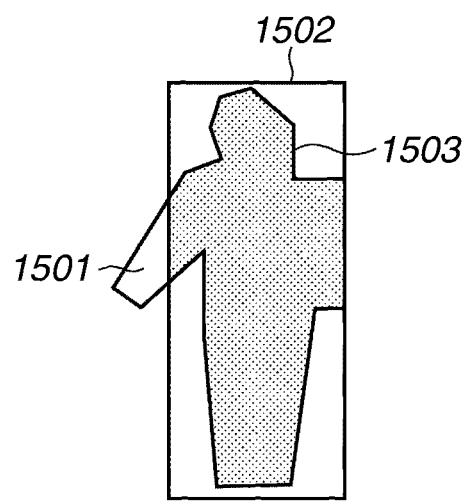
FIG. 15 illustrates an example of a logical product area.

FIG. 15 illustrates an example of the logical product area. An area 1501 represented by a polygon is a foreground area that has been determined to be a foreground by the foreground/background determination unit 206. An area 1502 represented by a rectangle is a subject area detected by the subject detection unit 207. A gray area 1503 is an overlap area (logical product area).

In the determination in step S1405, when the target pixel is included in the object area and the subject flag is "0" (the target pixel is not included in the subject area), an appearance time is taken as an extension target. Even when the target pixel is included in the object area and the subject flag is "1", and the target pixel is not included in the overlap area, an appearance time is also taken as an extension target. Thus, the background model can also be corrected for pixels corresponding to a background included in the subject area.

A method using the overlap area of the foreground area and the subject area assumes that the foreground area can correctly detect the contour of the subject. When the foreground area includes an area that is originally a background, e.g., a shadow of the subject, accuracy is decreased.

Figure 16:
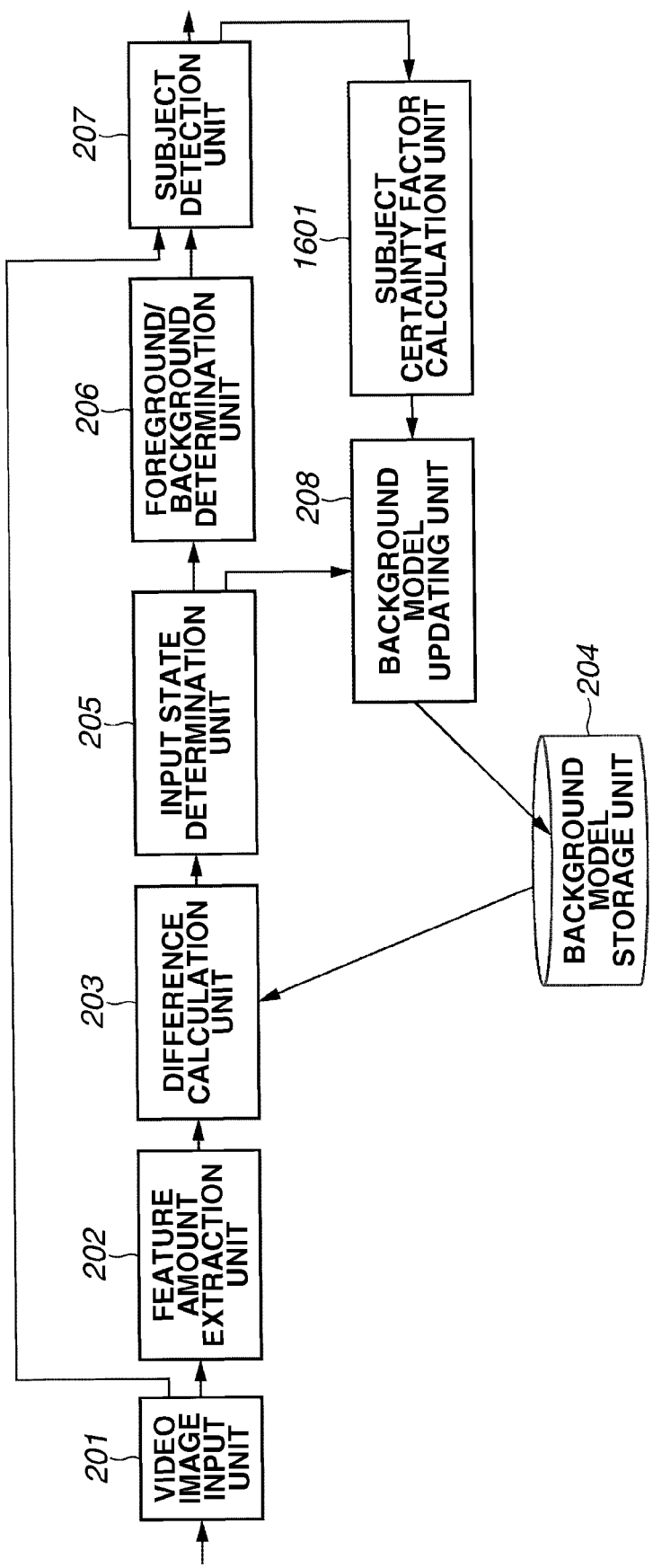
FIG. 16 illustrates an example of a functional configuration of an image processing apparatus.

As another method, a method for finding a subject certainty factor representing the degree to which an image can be certain of being a part of the subject for each position thereof from the result obtained by the subject detection unit 207 and updating the background model based thereon will be described. More specifically, the method considers an area having a low subject certainty factor as a background. As illustrated in FIG. 16, the image processing apparatus further includes a subject certainty factor calculation unit 1601 in addition to the configuration illustrated in FIG. 2.

Details of processing for calculating a subject certainty factor will be described below.

While a method for calculating a subject certainty factor includes two methods, described below, in the present exemplary embodiment, the present invention is not limited to these. Another method for obtaining a subject certainty factor of each pixel may be used.

(1) Method Using Subject Certainty Factor Distribution Generated from Learning Image A machine learning such as AdaBoost learning including a correct answer image and an incorrect answer image (see U.S. Patent Application Publication No. 2007-0237387) is required to generate weak determiners constituting the subject detection unit 207. As the correct answer image, a plurality of images that is uniform in a head position and a foot position within an image of a predetermined size is used so that a feature (e.g., a contour) common to human bodies can be learned. This will be used to describe a method for estimating, from the correct answer image, which position in a detected area looks most like a human body.

Details thereof will be described with reference to a diagram illustrating the subject certainty factor distribution illustrated in FIG. 17. An area 1701 represents the whole area of a correct answer image. A boundary line 1702 represents a boundary of an area having a concentration intensity that is a predetermined threshold value or more for a result obtained by averaging concentration gradients of all correct answer images. More specifically, the more internally in the boundary line 1702 a pixel is positioned, the higher the possibility that the pixel is a human body is. It is assumed that a subject certainty factor distribution corresponding to an auxiliary line 1703 is given using a normal distribution, as illustrated in FIG. 18.

Figure 17:
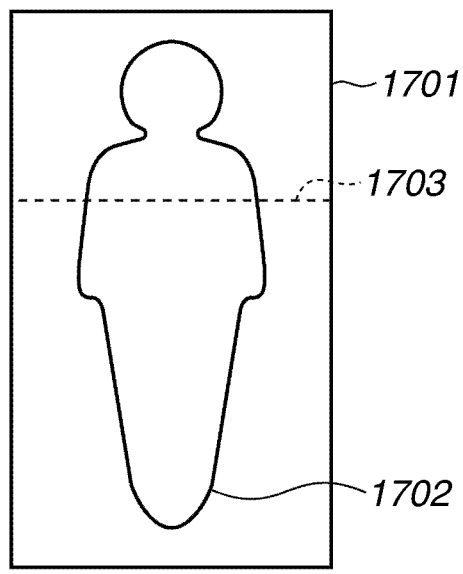
FIG. 17 illustrates a subject certainty factor distribution.
Figure 18:
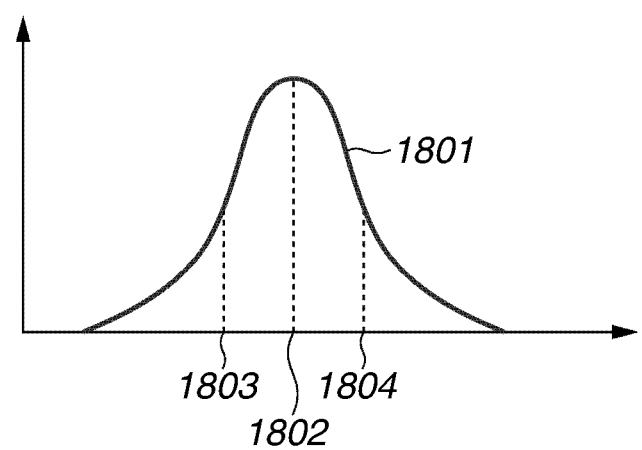
FIG. 18 illustrates a subject certainty factor distribution.

In FIG. 18, the horizontal axis indicates a position on the auxiliary line 1703 illustrated in FIG. 17, and the vertical axis indicates a subject certainty factor. A curve (a subject certainty factor distribution) 1801 conforms to the normal distribution, a point 1802 indicates an average of the subject certainty factor, and points 1803 and 1804 indicate positions spaced away from the average by a standard deviation. The average subject certainty factor 1802 is a maximum value "100". The average subject certainty factor 1802 is matched with a center position of the area 1701, and the positions 1803 and 1804 are matched with a point at which the auxiliary line 1703 and the boundary line 1702 contact each other, to determine the subject certainty factor distribution 1801.

Thus, a subject certainty factor distribution image in which subject certainty factors are respectively defined as pixel values at all positions in the area 1701 can be found using a statistical method from an image including a subject (a human body). The subject certainty factor distribution image is previously stored in the ROM 102, the secondary storage device 104, or the like, is read into the RAM 103 when the image processing apparatus is started, and is made referable by the subject certainty factor calculation unit 1601.

Figure 19:
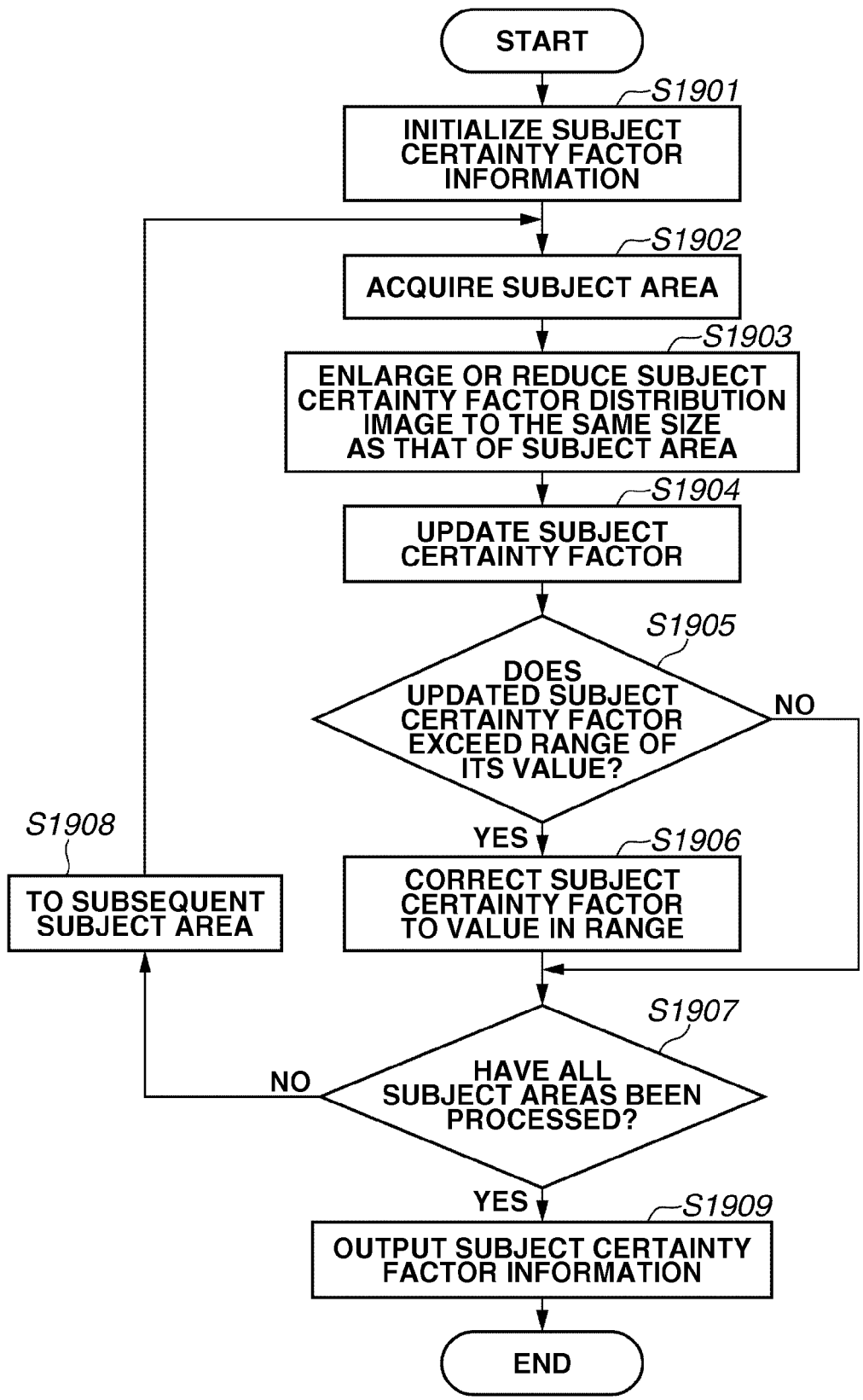
FIG. 19 illustrates an example of a flowchart relating to calculation processing.

Details of processing for calculating a subject certainty factor will be described below with reference to FIG. 19. FIG. 19 illustrates an example of a flowchart relating to calculation processing.

In step S1901, the subject certainty factor calculation unit 1601 initializes subject certainty factor information (one example of which is illustrated in FIG. 20). The subject certainty factor information represents a subject certainty factor stored for each of coordinates of all areas in a frame image. More specifically, the subject certainty factor calculation unit 1601 initializes the subject certainty factor information by setting the subject certainty factors for all the coordinates to "0".

In step S1902, the subject certainty factor calculation unit 1601 then acquires one area (subject area) where a subject flag is "1" from the object area information (FIG. 13).

The above-mentioned subject certainty factor distribution image is determined based on an image used during learning. Thus, the subject certainty factor distribution image has the size of the image used for learning. Therefore, enlargement/reduction processing conforming to the size of a detected subject is required. In step S1903, the subject certainty factor calculation unit 1601 enlarges or reduces the subject certainty factor distribution image using a nearest neighbor method, linear interpolation, or the like, like when a normal image is enlarged or reduced, to have the same size as that of the subject area.

In step S1904, the subject certainty factor calculation unit 1601 then updates a subject certainty factor of an area corresponding to the subject area on the subject certainty factor information with a subject certainty factor serving as a pixel value in the subject certainty factor distribution image the size of which has been changed. More specifically, the subject certainty factor calculation unit 1601 calculates the sum of the subject certainty factor in the subject certainty factor information and the subject certainty factor in the subject certainty factor distribution image as a new subject certainty factor.

In step S1905, the subject certainty factor calculation unit 1601 then checks whether the subject certainty factor updated in step S1904 exceeds a range (0 to 100) of its value. At this time, if it is determined that the subject certainty factor exceeds the range (YES in step S1905), the processing proceeds to step S1906. On the other hand, if the subject certainty factor does not exceed the range (NO in step S1905), the processing proceeds to step S1907.

In step S1906, the subject certainty factor calculation unit 1601 corrects the subject certainty factor in the range of the value. In step S1907, the subject certainty factor calculation unit 1601 determines whether all subject areas have been processed. At this time, if the subject certainty factor calculation unit 1601 determines that all the subject areas have been processed (YES in step S1907), the processing proceeds to step S1909. On the other hand, if the subject certainty factor calculation unit 1601 determines that not all the subject areas have been processed (NO in step S1907), the processing proceeds to step S1908. In step S1908, the subject certainty factor calculation unit 1601 advances the processing target to the subsequent subject area, and the processing then proceeds to step S1902.

In step S1909, the subject certainty factor calculation unit 1601 outputs final subject certainty factor information to the background model updating unit 208.

(2) Method for Estimation from Cumulative Score of Weak Classifiers in Subject Detection Unit The subject detection unit 207 calculates a cumulative score of weak classifiers by the following equation (2), where $a_t$ is reliability of each of the weak classifiers, and $h_t(x)$ is the weak classifier (a function taking two values of +1 when the weak classifier determines that a subject has been detected and −1 if the weak classifier determines that no subject has been detected:

$$F(x) = \Sigma_t a_t h_t(x) \quad (2)$$

The subject detection unit 207 determines whether a subject has been finally detected depending on a threshold value corresponding to the cumulative score $F(x)$. T (t=1 to T) weak classifiers exist. The cumulative score $F(x)$ is an accumulation of values $a_t$ each representing the degree to which the weak classifier is reliable, and thus is not a value directly representing the probability that the subject is included in an output result. It is assumed that the cumulative score $F(x)$ can be converted into a probability $P(y=+1|x)$ that the subject is included in the output result by being converted with a sigmoid function:

$$P(y=+1|x) = 1/(1+\exp(-w1F(x)-w0)) \quad (3)$$

Weights w1 and w0 of the sigmoid function can be found using a least-square method or the like from a relationship between the cumulative score $F(x)$ and a detection result of the subject by being actually detected for a sample image in which a plurality of correct answers (positions of the subject) has been found.

The subject detection unit 207 outputs all cumulative scores in each detection window before determining the subject as cumulative score information (one example of which is illustrated in FIG. 21) in association with a center position of the detection window. FIG. 21 illustrates an example of the cumulative score information. Coordinates are in a frame image at the center position of the detection window. The background model updating unit 208 uses the probability obtained in the conversion by the equation (3) in the subject certainty factor calculation unit 1601 as the subject certainty factor. Alternatively, the background model updating unit 208 can obtain subject certainty factor information by converting cumulative scores for all pixels.

The background model updating unit 208 uses the subject certainty factor calculated in the foregoing manner, as described below, for example.

The background model updating unit 208 determines whether the subject certainty factor is less than a predetermined value F instead of determining whether the target pixel is included in the subject area in the determination in step S1405. If the background model updating unit 208 determines that the subject certainty factor is less than the predetermined value F, the target pixel cannot be highly likely to be a subject, and thus the processing proceeds to step S1406. In step S1406, the background model updating unit 208 extends an appearance time.

Return to description of FIG. 14. If the background model updating unit 208 determines that the state of the current pixel is new (YES in step S1402), the processing from step S1408 to step S1411 is performed, to add the new state to the background model. When the image processing apparatus is started, the state of the current pixel is new for all coordinates in the frame image. Therefore, the new state is added to the background model. Thus, the background model is initialized.

First, the background model updating unit 208 refers to background model management information in the background model from the coordinates of the current pixel, to acquire a pointer to a state of coordinates that match the coordinates of the current pixel. In step S1408, the background model updating unit 208 advances the pointer to a state of coordinates of the subsequent pixel, to acquire a final state number of the state of the coordinates of the current pixel.

In step S1409, the background model updating unit 208 then assigns a state number of the new state. More specifically, a value following the final state number is used. The background model updating unit 208 assigns "1" when a state is first added to the background model, like when the image processing apparatus is started.

In step S1410, the background model updating unit 208 adds a state to the end of the final state of the current pixel, and thus refers to background model management information in the background model from the coordinates of the subsequent pixel, and acquires a pointer to a state of coordinates that match the coordinates of the subsequent pixel. In step S1411, the background model updating unit 208 then inserts the assigned state number, together with a feature amount of the current pixel in the input state information, a generation time, and an appearance time, into the background model as a new state.

In step S1412, the background model updating unit 208 determines whether all pixels (coordinates) in the frame image have been processed. At this time, if it is determined that all the pixels have been processed (YES in step S1412), the processing ends. If it is determined that not all the pixels have been processed (NO in step S1412), the processing proceeds to step S1413. In step S1413, the background model updating unit 208 advances the processing target to the subsequent pixel in the raster scan order, and the processing then proceeds to step S1410.

The foregoing is details of the background model updating processing in step S307.

By the processing for updating the background model, time information added to each state in the background model is corrected for the pixel that is highly likely to be a background from the result obtained by the subject detection unit 207. Thus, the accuracy of the background model is improved. Therefore, the foreground/background determination unit 206 can appropriately perform the determination.

According to the above-mentioned configuration, erroneous detection of a trace left after a person (a subject), which has existed at the time of initialization, moves, for example, can be corrected. For example, a search range for the detection of the subject does not reach a meaningless area. Therefore, the subject can be detected at high speed.

FIG. 22 illustrates an example of a hardware configuration of an image processing apparatus according to a second exemplary embodiment. The same components as those in the first exemplary embodiment are assigned the same reference numerals, and hence description thereof is not repeated.

The present exemplary embodiment differs from the first exemplary embodiment in that an image processing apparatus includes an external storage input/output device 2210 capable of reading and writing an optical disk 2211 (an example of a recording medium) such as a digital versatile disk (DVD) or a compact disk (CD), in which a program according to the present exemplary embodiment has been recorded.

When the optical disk 2211 is inserted into the external storage input/output device 2210, a CPU 101 can implement similar processing to that in the first exemplary embodiment by reading the program from the recording medium and rasterizing the read program into a RAM 103.

A storage medium for supplying the program includes a flexible disk, a hard disk, an optical disk, an magneto-optical disk, a CD, a DVD, a magnetic tape, a nonvolatile memory card, and a ROM.

An information processing apparatus (a computer) may execute the read program to implement a function of the image processing apparatus. An operating system that is operating on the computer may perform a part or the whole of actual processing based on an instruction of the program to implement the function of the image processing apparatus.

The program read out of the storage medium may be executed after being written into a memory provided in a function expansion board inserted into the computer or a function expansion unit connected to the computer. At this time, one or a plurality of processing elements and a CPU provided in the function expansion board or the function expansion unit may perform a part or the whole of actual processing to implement the function of the image processing apparatus.

While devices in the image processing apparatus are connected to one another via a bus 109, some of the devices may be connected to one another via a network I/F 108. For example, an image may be input by connecting an image input device 105 via the network I/F 108.

All units from a feature amount extraction unit 202 to a background model updating unit 208 may be stored in an integrated circuit chip and integrated with the image input device 105. Alternatively, only a subject detection unit 207 may be configured on a personal computer (PC), to receive a frame image or foreground area information (FIG. 11) via a LAN cable or the like and send object area information.

The present invention is also implemented by performing processing, described below. More specifically, the processing is performed by supplying software (a program) for implementing the function of the image processing apparatus according to the above-mentioned exemplary embodiment to a system or an apparatus via a network or various storage media and reading out the program by a computer (or a CPU or a micro processing unit (MPU)) in the system or the device.

According to the above-mentioned exemplary embodiments, a subject can be more appropriately detected.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-104517 filed May 9, 2011, which is hereby incorporated by reference herein in its entirety.

What is claimed is:

1. An image processing apparatus comprising:
a storage device configured to store a background model in which a feature amount is associated with time information for each of a plurality of states at each position of an image to be a background;
a memory configured to store a program; and
a processor configured to execute the program to provide:
an extraction unit configured to extract a feature amount for each position of an input video image;
an input state determination unit configured to compare the feature amount in the input video image with the feature amount of each of the plurality of states in the background model, to determine the state similar to the input video image, and update the time information of the state that has been determined to be similar to the input video image;
a foreground determination unit configured to determine a foreground area in the input video image based on the time information of the state that has been determined to be similar to the input video image by the input state determination unit;
a subject detection unit configured to detect a predetermined subject from the foreground area; and
an updating unit configured to update the time information of the state in the background model based on a detection result obtained by the subject detection unit.

2. The image processing apparatus according to claim 1, wherein the updating unit updates the time information of the state in the background model for an area where the subject has not been detected by the subject detection unit.

3. The image processing apparatus according to claim 1, wherein the updating unit updates the time information of the state in the background model for an area where the foreground area and a subject area of the subject overlap each other.

4. The image processing apparatus according to claim 1, further comprising
a calculation unit configured to calculate a subject certainty factor for each position of the input video image based on the result obtained by the subject detection unit,
wherein the updating unit updates the background model based on the subject certainty factor.

5. The image processing apparatus according to claim 4, wherein the calculation unit calculates the subject certainty factor based on a subject certainty factor distribution statistically obtained from an image including the subject.

6. The image processing apparatus according to claim 1, wherein a position of each of the image and the input video image is a position of a pixel or a partial area.

7. The image processing apparatus according to claim 1, wherein the time information is information relating to an existence time or an appearance time of the image.

8. An image processing method comprising:
storing a background model in which a feature amount is associated with time information for each of a plurality of states at each position of an image to be a background;
extracting the feature amount for each position of an input video image;
comparing the feature amount of the input video image with the feature amount of each of the plurality of states in the background model, to determine the state similar to the input video image, and updating time information of the state that has been determined to be similar to the input video image;
determining a foreground area in the input video image based on the time information of the state that has been determined to be similar to the input video image;
detecting a predetermined subject from the foreground area; and
updating the time information of the state in the background model based on a detection result of the predetermined subject.

9. A non-transitory computer-readable storage medium storing a program that causes a computer to execute the image processing method according to claim 8.

10. The image processing apparatus according to claim 2, wherein the time information is an appearance time of the image and the updating unit extends the appearance time of the state in the background model for the area where the subject has not been detected.

* * * * *